US009450264B2

(12) United States Patent
Osada et al.

(10) Patent No.: US 9,450,264 B2
(45) Date of Patent: Sep. 20, 2016

(54) VEHICLE-MOUNTED CELL STACK SYSTEM

(71) Applicant: NISSAN MOTOR CO., LTD., Kanagawa (JP)

(72) Inventors: Takahito Osada, Yamanashi (JP); Shoichi Nakamura, Yokohama (JP); Naoko Abe, Yokohama (JP); Mitsutaka Abe, Yokohama (JP)

(73) Assignee: Nissan Motor Co., Ltd., Yokohama-Shi, Kanagawa (JP)

( * ) Notice: Subject to any disclaimer, the term of this patent is extended or adjusted under 35 U.S.C. 154(b) by 247 days.

(21) Appl. No.: 14/384,596

(22) PCT Filed: Mar. 12, 2013

(86) PCT No.: PCT/JP2013/056709
§ 371 (c)(1),
(2) Date: Sep. 11, 2014

(87) PCT Pub. No.: WO2013/137215
PCT Pub. Date: Sep. 19, 2013

(65) Prior Publication Data

US 2015/0037702 A1 Feb. 5, 2015

(30) Foreign Application Priority Data

Mar. 13, 2012 (JP) ................................ 2012-056138

(51) Int. Cl.
*H01M 8/24* (2016.01)
*B60L 11/18* (2006.01)
(Continued)

(52) U.S. Cl.
CPC ............ *H01M 8/2465* (2013.01); *B60L 1/003* (2013.01); *B60L 11/1892* (2013.01); *B60L 11/1896* (2013.01); *B60L 11/1898* (2013.01); *H01M 8/0202* (2013.01); *H01M 8/0494* (2013.01);(Continued)

(58) Field of Classification Search
CPC ........... H01M 8/2465; H01M 8/0494; H01M 8/04552; H01M 8/0202; H01M 8/2475; B60L 1/003; B60L 11/1896; B60L 11/1898; B60L 11/1892; B60K 2001/0411
See application file for complete search history.

(56) References Cited

U.S. PATENT DOCUMENTS 6,674,264 B2 * 1/2004 Sato .................... H01M 8/0247 320/101
2005/0074655 A1 * 4/2005 Ariyoshi ................ H01M 8/02 429/430

(Continued)

FOREIGN PATENT DOCUMENTS

JP 2007015615 A 1/2007
JP 2007-128752 * 5/2007 .............. H01M 8/24
JP 2007128752 A 5/2007

*Primary Examiner* — Ula C Ruddock
*Assistant Examiner* — Amanda Barrow
(74) *Attorney, Agent, or Firm* — Young Basile Hanlon & MacFarlane, P.C.

(57) ABSTRACT

A vehicle-mounted cell stack system includes a cell stack that comprises a plurality of laminated power generating cells, and power collecting plates that sandwich both outermost power generating cells, electric wires connected to the power collecting plates, and an electric load connected to the power collecting plates via the electric wires and configured to be activated by electric power that is supplied from the cell stack. The electric wires are connected to the power collecting plates in a direction other than a cell laminating direction.

9 Claims, 7 Drawing Sheets

300
30
30
200

(51) Int. Cl.
*H01M 8/04* (2016.01)
*H01M 8/02* (2016.01)
*B60L 1/00* (2006.01)
*B60K 1/04* (2006.01)

(52) U.S. Cl.
CPC ..... *H01M 8/04552* (2013.01); *H01M 8/2475* (2013.01); *B60K 2001/0411* (2013.01); *H01M2250/20* (2013.01); *Y02E 60/50* (2013.01); *Y02T 90/32* (2013.01); *Y02T 90/34* (2013.01)

(56) References Cited

U.S. PATENT DOCUMENTS

2007/0087237 A1* 4/2007 An .................... H01M 8/04552 429/432
2010/0112412 A1* 5/2010 Aoto ........................ B60K 1/04 429/515
2012/0015257 A1* 1/2012 Arisawa ................... B60K 1/04 429/400
2012/0129069 A1* 5/2012 Hotta ................ H01M 8/04552 429/452

* cited by examiner

VEHICLE-MOUNTED CELL STACK SYSTEM

CROSS REFERENCE TO RELATED APPLICATION

The present application claims priority to Japanese Patent Application No. 2012-56138, filed with the Japan Patent Office on Mar. 13, 2012, the entire contents of which are incorporated into this specification by reference.

TECHNICAL FIELD

This invention relates to a vehicle-mounted cell stack system.

BACKGROUND

JP 2007-15615 A discloses that a fuel cell stack (cell stack) including laminated power generating cells (unit cells) is arranged under a floor. Further, JP 2007-15615 A discloses that a circuit case is arranged on a surface that is parallel to a lamination surface of the power generating cells.

SUMMARY

By the way, the inventors of this invention have been developing a fuel cell stack structured to be arranged in a motor compartment (conventionally referred to as an engine compartment) in front of a cabin. The motor compartment (engine compartment) has a small free space. In a case where the fuel cell stack that is structured as disclosed in JP 2007-15615 A is arranged in such a limited space, there arises a problem in that a large number of the power generating cells cannot be laminated.

The present invention has been made in view of such a problem inherent in the related art. It is an object of the present invention to provide a vehicle-mounted cell stack system that effectively utilizes a limited space so that a larger number of power generating cells can be laminated.

According to one aspect of the present invention, there is provided a vehicle-mounted cell stack system, including: a cell stack that comprises a plurality of laminated power generating cells, and power collecting plates that sandwich both outermost power generating cells; electric wires connected to the power collecting plates; and an electric load connected to the power collecting plates via the electric wires and configured to be activated by electric power that is supplied from the cell stack. The electric wires are connected to the power collecting plates in a direction other than a cell laminating direction.

Embodiments and advantages of the present invention will be described in detail below with reference to the attached figures.

DESCRIPTION OF EMBODIMENTS

Figure 1A:
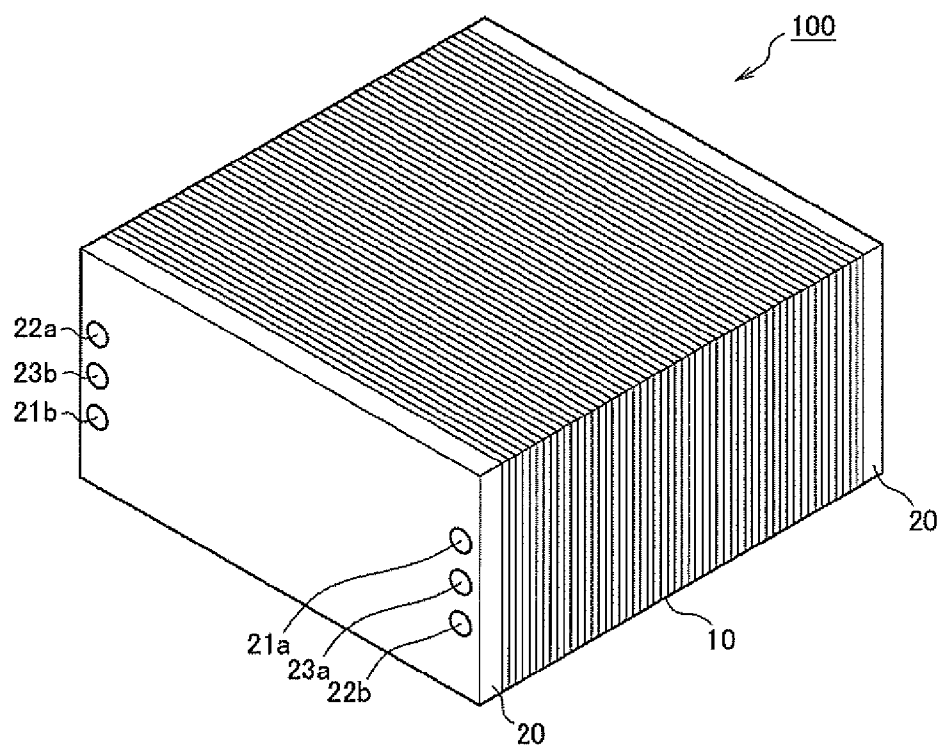
FIG. 1A is an external perspective view illustrating a fuel cell stack.
Figure 1B:
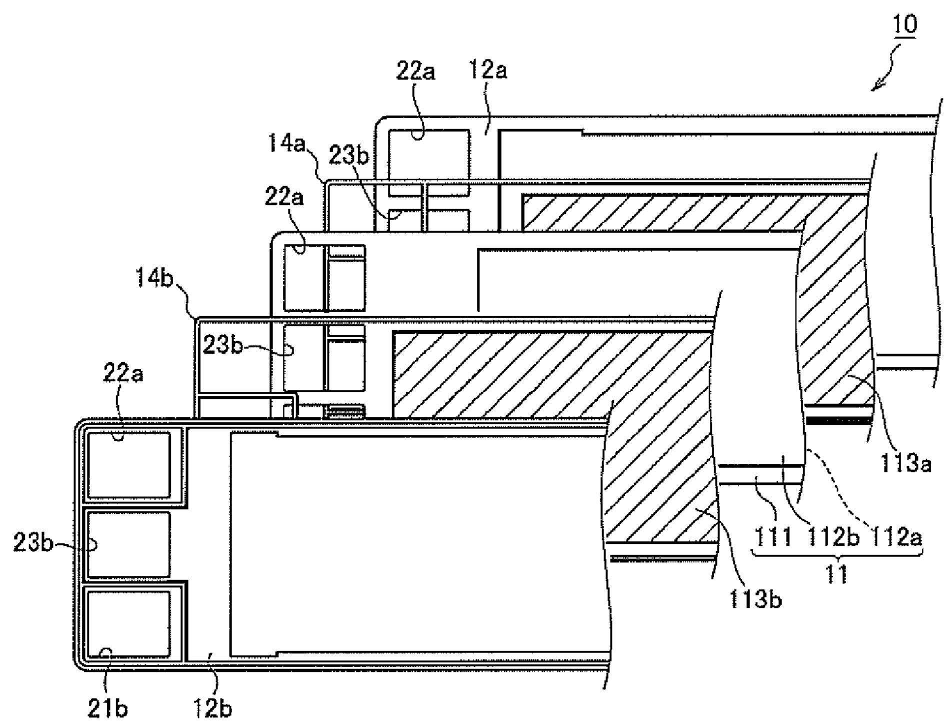
FIG. 1B is an exploded view of a structure of a power generating cell of the fuel cell stack.

FIGS. 1A and 1B are explanatory views of a fuel cell stack. FIG. 1A is an external perspective view. FIG. 1B is an exploded view of a structure of a power generating cell.

As illustrated in FIG. 1A, a fuel cell stack 100 includes a plurality of laminated power generating cells 10, and power collecting plates 20. The fuel cell stack 100 is formed into a rectangular parallelepiped shape. The fuel cell stack 100 of the type exemplified in this embodiment is housed in a stack case 200 as described later.

The power generating cells 10 are each a unit cell of the fuel cell stack. The power generating cells 10 each generate an electromotive voltage of approximately one volt (V). Description of details of the structure of each of the power generating cells 10 is made later.

The power collecting plates 20 are provided in a pair, and respectively arranged on outsides of the plurality of laminated power generating cells 10. The power collecting plates 20 are each made of a gas-impermeable conductive member such as high density carbon and a metal material.

One of the power collecting plates 20 (power collecting plate 20 that is a near side on the left in FIG. 1A) has an anode supply port 21*a*, an anode discharge port 21*b*, a cathode supply port 22*a*, a cathode discharge port 22*b*, a coolant supply port 23*a*, and a coolant discharge port 23*b*, which are provided along a short side of the power collecting plate 20. In this embodiment, the anode supply port 21*a*, the coolant supply port 23*a*, and the cathode discharge port 22*b* are provided on the right side in FIG. 1A. Further, the cathode supply port 22*a*, the coolant discharge port 23*b*, and the anode discharge port 21*b* are provided on the left side in FIG. 1A.

As examples of a method of supplying hydrogen as an anode gas to the anode supply port 21*a*, there are given a method of supplying a hydrogen gas directly from a hydrogen storage device, and a method of supplying a hydrogen-containing gas that is obtained through reformation of fuel containing hydrogen. It should be noted that examples of the hydrogen storage device include a high-pressure gas tank, a liquefied hydrogen tank, and a hydrogen absorbing alloy tank. Examples of the fuel containing hydrogen include a natural gas, methanol, and gasoline. Further, air is generally used as a cathode gas to be supplied to the cathode supply port 22*a*.

As illustrated in FIG. 1B, each of the power generating cells 10 has such a structure that an anode separator (anode bipolar plate) 12*a* and a cathode separator (cathode bipolar plate) 12*b* are arranged on both surfaces of a membrane electrode assembly (MEA) 11.

In the MEA 11, electrode catalyst layers 112 are formed on both surfaces of an electrolyte membrane 111 formed of an ion exchange membrane. Gas diffusion layers (GDL) 113 are formed on the electrode catalyst layers 112.

The electrode catalyst layers 112 are each formed, for example, of carbon black particles that carry platinum.

The GDLs 113 are each formed of a member having sufficient gas diffusion property and conductivity, such as carbon fiber.

The anode gas supplied through the anode supply port 21*a* flows along the GDL 113*a*, reacts with the anode electrode catalyst layer 112 (112*a*), and is discharged through the anode discharge port 21*b*.

The cathode gas supplied through the cathode supply port 22*a* flows along the GDL 113*b*, reacts with the cathode electrode catalyst layer 112 (112*b*), and is discharged through the cathode discharge port 22*b*.

The anode separator 12*a* is laminated on one surface (back surface in FIG. 1B) of the MEA 11 through intermediation of the GDL 113*a* and a seal 14*a*. The cathode separator 12*b* is laminated on another surface (front surface in FIG. 1B) of the MEA 11 through intermediation of the GDL 113*b* and a seal 14*b*. Examples of the seals 14 (14*a* and 14*b*) include rubber elastic materials such as silicone rubber, ethylene propylene rubber (ethylene propylene diene monomer; EPDM), and fluororubber. The anode separator 12*a* and the cathode separator 12*b* are each obtained through press forming of a separator preform made of a metal such as stainless steel so that reactant gas flow paths are formed on one surface thereof, and that coolant flow paths are formed on an opposite surface thereof in arrays alternately to the reactant gas flow paths. The anode separator 12*a* and the cathode separator 12*b* are laminated as illustrated in FIG. 1B. With this, the coolant flow paths are formed.

Holes 21*a*, 21*b*, 22*a*, 22*b*, 23*a*, and 23*b* are formed in the MEA 11, the anode separator 12*a*, and the cathode separator 12*b*, respectively. Those holes are aligned with each other so as to form the anode supply port (anode supply manifold) 21*a*, the anode discharge port (anode discharge manifold) 21*b*, the cathode supply port (cathode supply manifold) 22*a*, the cathode discharge port (cathode discharge manifold) 22*b*, the coolant supply port (coolant supply manifold) 23*a*, and the coolant discharge port (coolant discharge manifold) 23*b*.

It should be noted that, although not shown, harnesses 30 for taking out electric power generated by the power generating cells 10 are connected to the power collecting plates 20.

Figure 2:
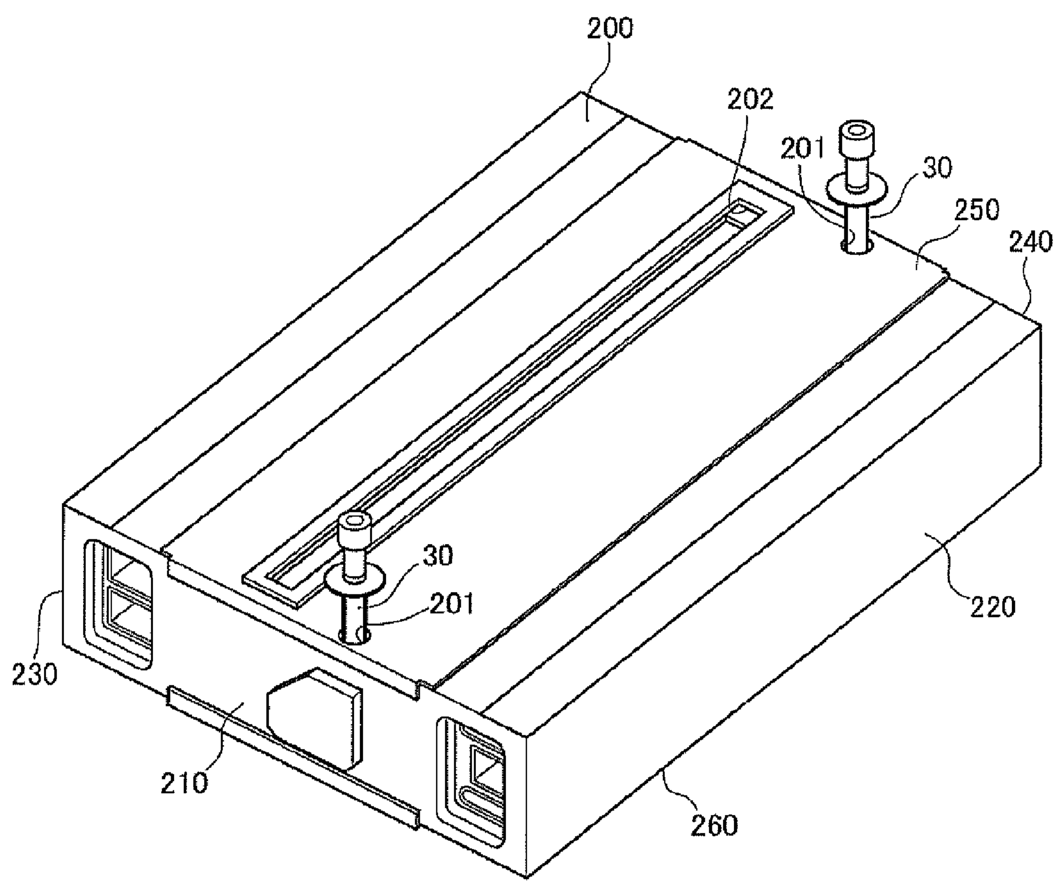
FIG. 2 is an exterior view of a stack case for housing the fuel cell stack.

FIG. 2 is an exterior view of the stack case for housing the fuel cell stack.

The stack case 200 is formed into a rectangular parallelepiped shape. The stack case 200 is formed of six surfaces, that is, a front wall 210, side walls 220 and 230, a rear wall 240, an upper wall 250, and a bottom wall 260. The front wall 210 and the rear wall 240 are parallel to surfaces (lamination surfaces) of the power generating cells 10. The side walls 220 and 230 are perpendicular to the surfaces (lamination surfaces) of the power generating cells 10, and parallel to short sides of the power generating cells 10. In other words, the side walls 220 and 230 are perpendicular to longitudinal sides of the power generating cells 10. The upper wall 250 and the bottom wall 260 are perpendicular to the surfaces (lamination surfaces) of the power generating cells 10, and parallel to the longitudinal sides of the power generating cells 10. In other words, the upper wall 250 and the bottom wall 260 are perpendicular to the short sides of the power generating cells 10.

The upper wall 250 has holes 201 formed therein. The harnesses 30, which are connected to the power collecting plates 20 so as to take out the electric power generated by the power generating cells 10, are inserted through the holes 201. The fuel cell stack as a whole generates high electric current, and hence the harnesses 30 are each formed to have a large diameter and a high rigidity.

Further, the upper wall 250 has an angular hole 202 formed therein. As described later, terminals of a cell voltage monitor are inserted to the angular hole 202.

Figure 3:
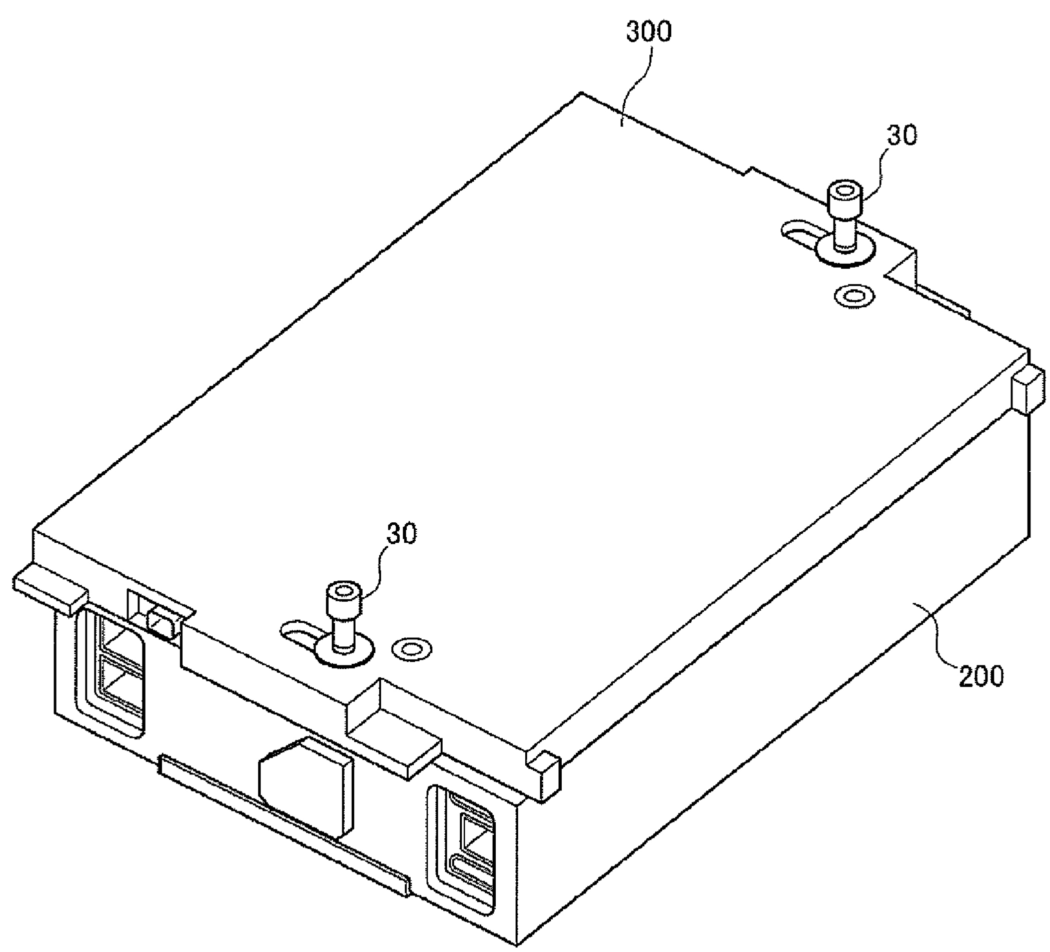
FIG. 3 is a view of a state in which a CVM case is arranged on a stack case.

FIG. 3 is a view of a state in which a CVM case is arranged on the stack case.

Figure 4:
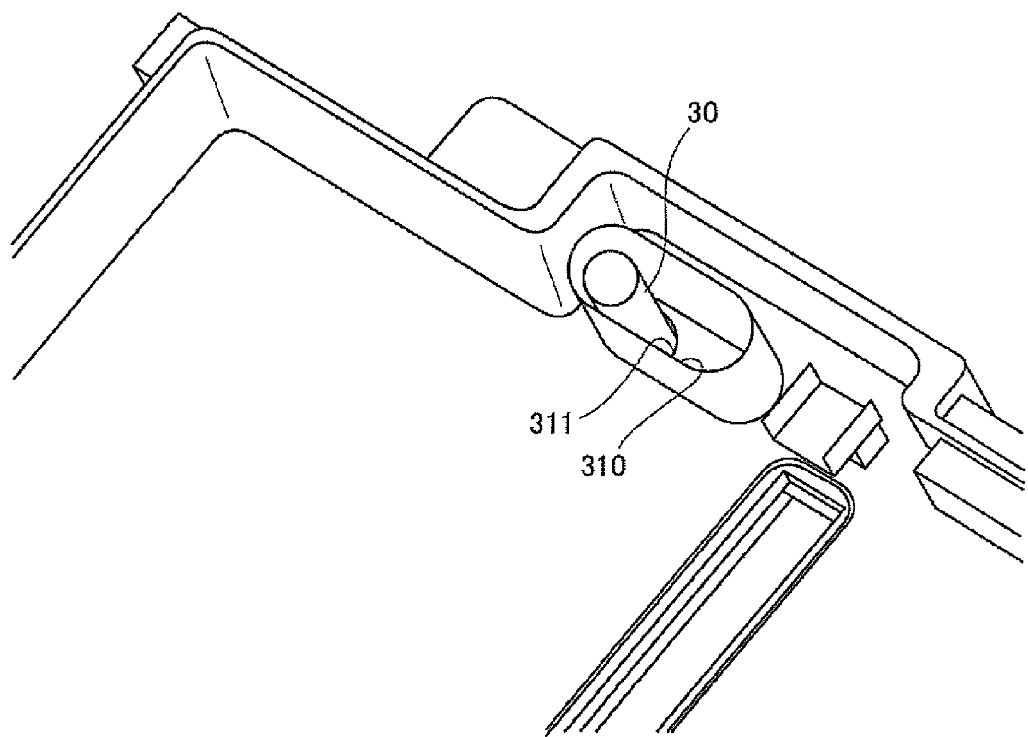
FIG. 4 is a perspective view of an inside of the CVM case.

A CVM case 300 is superimposed on the stack case 200. The CVM case 300 houses the cell voltage monitor (CVM) for monitoring a voltage of each of the power generating cells 10. The terminals of the cell voltage monitor are inserted to the angular hole 202 formed through the upper wall 250 of the stack case 200, and are connected respectively to the power generating cells 10. The CVM case 300 is provided with spaces 310 through which the harnesses 30 are inserted. As illustrated in FIG. 4, the harness insertion space 310 is surrounded by a partition wall 311, and is isolated from the cell voltage monitor. It should be noted that the harness insertion space 310, which is formed into an oblong shape in this embodiment, is merely an example, and hence may be formed into another shape.

Figure 5:
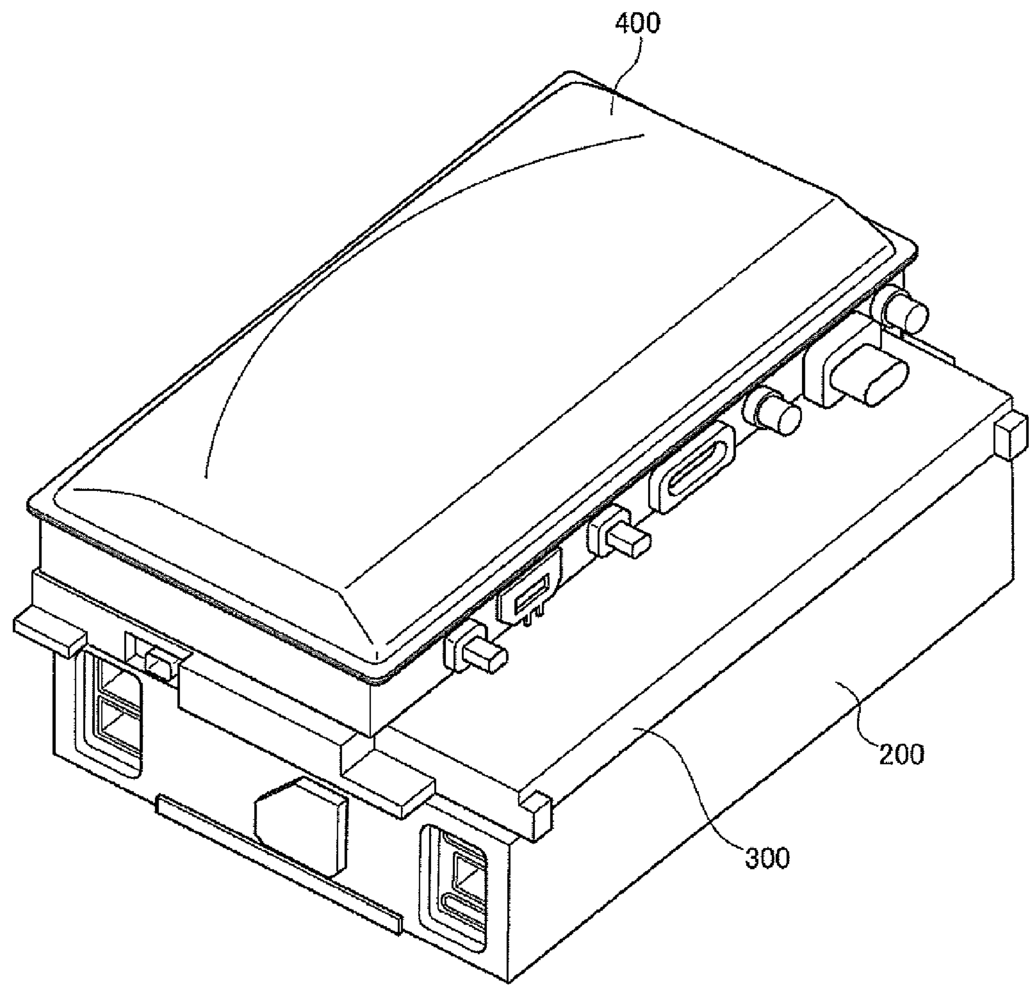
FIG. 5 is a view of a state in which a PDM case is further arranged on the CVM case.

FIG. 5 is a view of a state in which a PDM case is further arranged on the CVM case.

Figure 6:
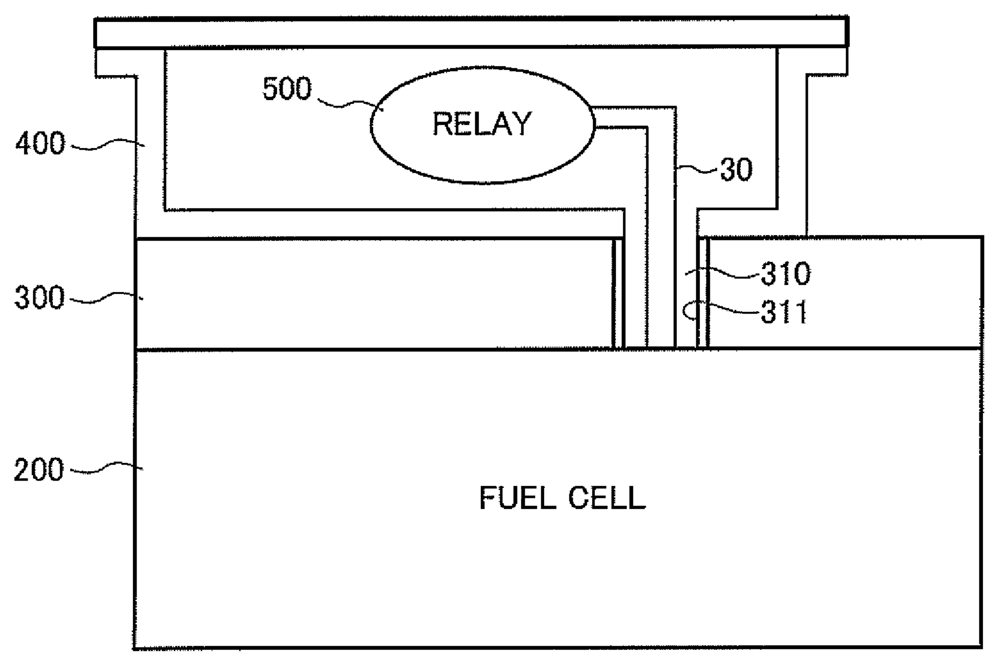
FIG. 6 is a sectional view of insides of the CVM case and the PDM case.

A PDM case 400 is superimposed on the CVM case 300. The PDM case 400 houses a power delivery module (PDM) for managing electric power that is generated in the system. Further, as illustrated in FIG. 6, the PDM case 400 houses a relay circuit 500. A hole is formed in a bottom wall of the PDM case 400, and the harnesses 30 are inserted through the hole. The harnesses 30 are connected to a drive motor or an air supply compressor through intermediation of the relay circuit 500. In a situation in which electric current needs to be shut off, the relay circuit 500 is opened. The PDM case 400 is fixed to the CVM case 300. Specifically, the PDM case 400 is fixed to the CVM case 300 with, for example, bolts. The PDM case 400 may be held in direct contact with the CVM case 300, or a gasket may be interposed therebetween. With this structure, higher fitting property is obtained, and hence entry of foreign matters such as moisture is prevented.

Figure 7A:
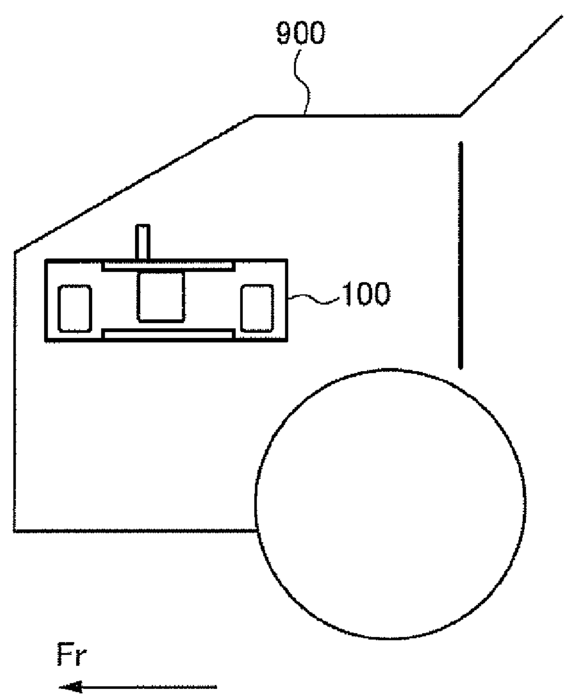
FIG. 7A is a side view illustrating a state in which a vehicle-mounted cell stack system is mounted on a vehicle.
Figure 7B:
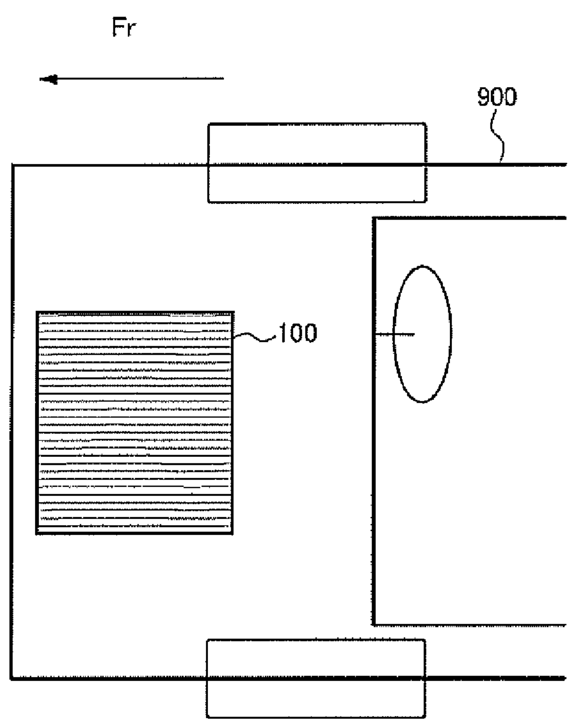
FIG. 7B is a plan view illustrating the state in which the vehicle-mounted cell stack system is mounted on the vehicle.

FIGS. 7A and 7B are each a view illustrating a state in which a vehicle-mounted cell stack system is mounted on a vehicle. FIG. 7A is a side view, and FIG. 7B is a plan view.

The fuel cell stack 100 is mounted in a space (engine compartment) located in front of a cabin. It should be noted that a fuel cell vehicle does not have an internal combustion engine mounted thereto, but the front space in which an internal combustion engine for an engine vehicle is to be mounted is conventionally referred to as an engine compartment. The power generating cells 10 of the fuel cell stack 100 are arrayed in a width direction of a vehicle 900. In other words, the lamination surfaces of the power generating cells 10 are parallel to a fore-and-aft direction and a vertical direction of the vehicle 900. Further, as described above, the harnesses 30 for taking out the electric power generated by the power generating cells 10 are perpendicular to the surfaces (lamination surfaces) of the power generating cells 10, and are inserted through the holes 201 in the upper wall 250 that is parallel to the longitudinal sides of the power generating cells 10. In addition, the harnesses 30 are inserted through the harness insertion spaces 310 of the CVM case 300, and are connected to the relay circuit 500 housed in the PDM case 400. With this structure, the relay circuit 500 is not arranged side by side with the power generating cells 10. Thus, even in a case where the fuel cell stack 100 is arranged in a limited space such as the engine compartment, a larger number of the power generating cells 10 can be reliably arrayed.

According to this embodiment, among the outer walls of the stack case for housing the power generating cells, the holes 201 are formed through the upper wall 250 that is perpendicular to the lamination surfaces of the power generating cells, and the harnesses 30 are inserted through the holes 201. As described above, the harnesses 30 each have a large diameter and a high rigidity. The relay circuit 500 is arranged in an extension direction of the harnesses 30 having such a high rigidity. With this structure, the relay circuit 500 is not arranged side by side with the power generating cells 10. In a case where the harnesses each have a low rigidity, the relay circuit 500 can be arranged irrespective of positions of holes to be formed through the outer wall of the stack case. However, actually, the harnesses 30 each have a high rigidity, and hence it is impractical to arrange the relay circuit 500 irrespective of the positions of the holes to be formed through the outer wall of the stack case. In this embodiment, with the structure described above, the relay circuit 500 is not arranged side by side with the power generating cells 10. As a result, even in a case where the fuel cell stack 100 is arranged in the limited space such as the engine compartment, higher mountability can be achieved, and hence a larger number of the power generating cells 10 can be reliably arrayed. Thus, output from the fuel cell stack can be increased.

Further, the CVM case 300 is superimposed on the stack case, and the PDM case 400 is superimposed on the CVM case 300. In addition, the CVM case 300 is provided with the harness insertion spaces 310 each surrounded by the partition wall and isolated from the cell voltage monitor, and the harnesses 30 are inserted through the spaces 310. The cell voltage monitor is configured to monitor the voltage of each of the power generating cells. The voltage of each of the power generating cells is as small as approximately one volt, and hence the voltage may not be accurately detected when any noise is present. Meanwhile, according to this embodiment, the harnesses 30 are inserted through the spaces 310 that are surrounded by the partition walls and isolated from the cell voltage monitor. Thus, adverse effects on the cell voltage monitor can be prevented.

Still further, the harnesses 30 are inserted through the spaces 310 of the CVM case 300, and hence additional structures for protecting the harnesses 30 need not be provided. As a result, the structure can be simplified.

Yet further, the power delivery module is heavy, and hence the PDM case 400 housing the power delivery module becomes heavier in accordance therewith. Meanwhile, the partition walls are provided to the CVM case 300, and hence a strength of the CVM case 300 can also be increased.

Yet further, the PDM case 400 is fixed to the CVM case 300 (with, for example, bolts). In a case where a gasket is interposed therebetween, higher fitting property is obtained, and hence entry of foreign matters such as moisture is prevented.

Yet further, the relay circuit 500 is housed in the PDM case 400. Thus, an additional case for housing the relay circuit 500 is unnecessary. In addition, the power delivery module, through which high electric current is caused to flow, is housed in the PDM case 400. Such a power delivery module is less liable to be influenced by noise, and hence the electric power that is generated in the system can be accurately managed even when the relay circuit 500 is provided.

In addition, the PDM case 400 is large in size, and hence a sufficient space for housing the relay circuit 500 can be secured.

Yet further, the holes 201 are formed through the upper wall 250. Even in a case where the holes 201 are formed through the bottom wall 260, and the stack case 200 is underlaid with the CVM case 300 and the PDM case 400, a larger number of the power generating cells 10 can be reliably arrayed. However, moisture that is generated in the fuel cell stack may enter the CVM case 300. As a countermeasure, in this embodiment, the holes 201 are formed through the upper wall 250, and the CVM case 300 and the PDM case 400 are superimposed on the stack case 200. With this, even when the moisture is generated in the fuel cell stack, the moisture can be prevented from entering the CVM case 300.

In order to secure the reactant flow paths, it is desired that the longitudinal sides of the power generating cells 10 be as large as possible. Further, in order to suppress variation of flow among the cells, it is desired that the short sides thereof be as small as possible. In view of this, in this embodiment, the holes 201 are formed through the wall that is perpendicular to the short sides of the power generating cells 10, in other words, through the wall that is parallel to the longitudinal sides of the power generating cells 10, and the harnesses 30 are inserted therethrough. The CVM case 300 and the PDM case 400 are superimposed along the longitudinal sides of the stack case 200. With this, the desired structure as described above can be obtained.

An embodiment of the present invention was described above, but the above embodiment merely illustrates a part of examples of applications of the present invention, and the technical scope of the present invention is not limited to the specific configurations described in the embodiment.

For example, the fuel cell stack (cell stack) 100 of the type exemplified in the above description is housed in the stack case 200. However, this invention is not limited thereto. This invention is applicable also to a type in which the fuel cell stack (cell stack) 100 is not housed in the stack case 200.

Further, as in the above description, the harnesses 30 are connected to the power collecting plates 20. The harnesses 30 may be provided separately from the power collecting plates 20, or extended parts may be provided to the power collecting plates 20 so as to be used instead of the harnesses 30. In other words, the harnesses 30 may be provided integrally with the power collecting plates 20. With this, the structure can be simplified to reduce a thickness, and hence a larger number of the power generating cells can be laminated.

The invention claimed is:

1. A vehicle-mounted cell stack system, comprising:

a cell stack that comprises a plurality of laminated power generating cells, and power collecting plates that sandwich both outermost power generating cells;

electric wires connected to the power collecting plates;

an electric load connected to the power collecting plates via the electric wires and configured to be activated by electric power that is supplied from the cell stack; and a cell voltage monitor case (CVM case) that is superimposed on the cell stack and houses a cell voltage monitor for monitoring a voltage of each of the power generating cells, wherein the electric wires are connected to the power collecting plates in a direction other than a cell laminating direction, and the CVM case comprises electric wire insertion spaces that are surrounded by partition walls and are isolated from the cell voltage monitor.

2. The vehicle-mounted cell stack system according to claim 1, further comprising:

a PDM case that is superimposed on the CVM case and houses a power delivery module for managing electric power that is generated in the vehicle-mounted cell stack system.

3. The vehicle-mounted cell stack system according to claim 2, further comprising a gasket that is interposed between the CVM case and the PDM case, wherein the PDM case is fixed to the CVM case.

4. The vehicle-mounted cell stack system according to claim 2, further comprising a power shut-off relay that is housed in the PDM case, wherein the electric wires are connected to the electric load via the power shut-off relay.

5. The vehicle-mounted cell stack system according to claim 1, wherein lamination surfaces of the power generating cells are parallel to a fore-and-aft direction of a vehicle and a vertical direction of the vehicle.

6. The vehicle-mounted cell stack system according to claim 1, wherein the electric wires are connected to the power collecting plates from a top of each of the power collecting plates.

7. The vehicle-mounted cell stack system according to claim 1, wherein the electric wires are connected to the power collecting plates in a direction that is perpendicular to longitudinal sides of the power generating cells.

8. The vehicle-mounted cell stack system according to claim 1, wherein the electric wires are formed integrally with the power collecting plates.

9. The vehicle-mounted cell stack system according to claim 1, wherein the cell stack is accommodated in an engine compartment that is a space in front of a cabin.

* * * * *